ERROR DETECTION AND CORRECTION APPARATUS

Filed June 16, 1965 Sheet 1 of 3

INVENTORS
DAVID T. BROWN
CHARLES H. WOLFF

BY Owen Lamb
AGENT 3,439,331

ERROR DETECTION AND CORRECTION APPARATUS

David Trent Brown, Wappingers Falls, and Charles Harry Wolff, Poughkeepsie, N.Y., assignors to International Business Machines Corporation, Armonk, N.Y., a corporation of New York Filed June 16, 1965, Ser. No. 464,282
Int. Cl. G08b *29/00;* G11b *5/00;* G06f *11/00*
U.S. Cl. 340—146.1 8 Claims

ABSTRACT OF THE DISCLOSURE

An error detection and correction circuit for locating which one of a plurality of recorded data tracks contains an error and for correcting the error. The data in the recorded channels is encoded into an $m$-element permutation code constructed from code groups comprising the plurality of channels, in accordance with a single-error-correcting/multiple-error-detecting code. This produces $m$ streams of data bits, each stream corresponding to one element of the constructed code group. The streams are then fed to $m$ linear feed-back shift registers having feed-back connections constructed in accordance with a cyclic redundancy code which further codes the permutation code modulo a coding polynominal. After a block of data has been processed, the shift registers contain check bits which are stored with the data. When the block of data is read, the data in the parallel tracks are again coded into the $m$ element permutation code to thereby produce $m$ streams of data bits which are applied to feed-back shift registers which are now used to detect a bit failure in any one of the streams of bits. Means are provided for decoding the failed check bit streams in accordance with the error-correcting premutation code to thereby identify the track or tracks in which the failure occurs.

This invention relates to error detection and correction and more particularly, to means for locating which one of a plurality of recorded data tracks contains an error and for correcting that error.

Error correction utilizing a combination of longitudinal redundancy and byte redundancy is described in copending U.S. patent application, Ser. No. 246,707, by D. R. Dustin et al., now Patent No. 3,273,120. Dustin et al., discloses how an erroneous bit in a data block read from magnetic tape may be corrected after the track in error has been determined by a longitudinal redundancy check. This is accomplished by utilizing the byte redundancy during a rereading to determine the particular byte having the error and by inverting the bit in the track located by the longitudinal redundancy check.

In the Sellers, Jr., et al., U.S. patent application, Ser. No. 357,367, a cyclic redundancy check (CRC) byte is utilized to locate the particular track in error.

It is a paramount object of the present invention to provide improved means for locating a particular track in error so that the erroneous bit position in a byte having an error may be corrected.

It is also an object of this invention to provide an improved error detection system for data recorded in parallel tracks, which system detects all tracks containing errors.

It is a further object of this invention to provide an error detection system for detecting multiple errors in a parallel recording system and for correcting all single errors occurring in the system.

The above objects are accomplished in accordance with the invention by providing means for encoding data in parallel recorded tracks into an $m$-element permutation code constructed from code groups comprising the plurality of tracks, in accordance with a single-error-correcting/multiple-error-detecting code. Each element of the constructed code group is then fed to $m$ linear feedback shift registers (LFSR) having feedback connections constructed in accordance with a cyclic redundancy code for coding the permutation code group check bits modulo a coding polynomial.

Thus, the data in the parallel tracks are coded into an $m$ bit multiple error-correcting code to thereby produce $m$ streams of parallel check bits. The LFSR's detect a bit failure in any one of the streams of bits. Means are then provided for decoding the failed check bits according to the error-correcting permutation code to thereby identify the track or tracks causing the failure.

In accordance with the error-correcting aspects of the invention, the record is reread and the located track-in-error is combined with a vertical redundancy check bit failure to correct a single error.

The invention has the advantage that a powerful multiple error detecting and single error correction code may be utilized to detect multiple errors and correct a single error without the necessity of storing the entire data block. Furthermore, the invention has the advantage that it is not necessary to record fixed length data records in order to benefit from a multiple-error detection/correction code.

The foregoing and other objects, features, and advantages of the invention will be apparent from the following more particular description of a preferred embodiment of the invention, as illustrated in the accompanying drawings:

Figure 2:
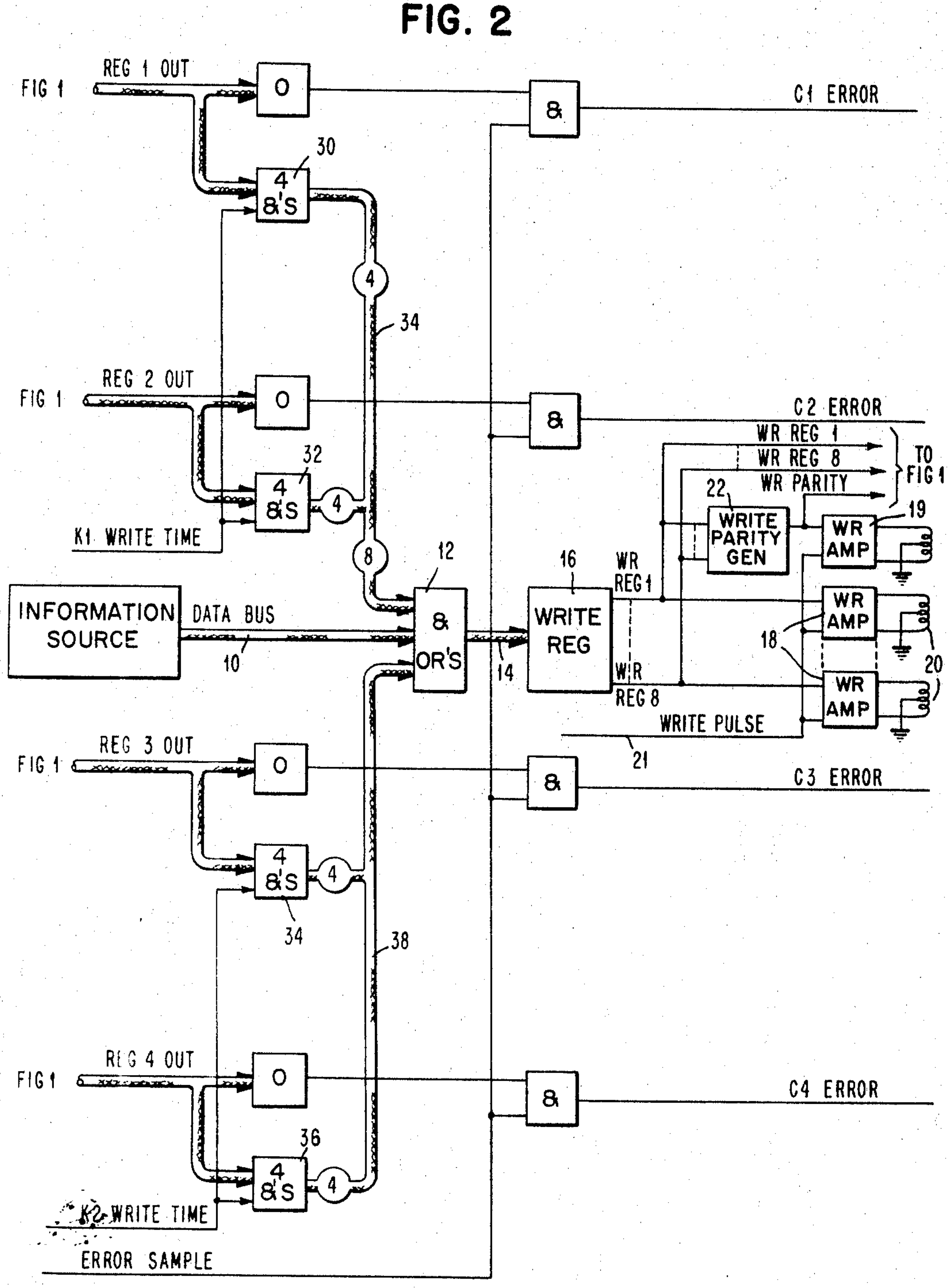
FIG. 2 is a block schematic diagram of the write circuit portion of a magnetic tape system utilizing the present invention.

Referring now to FIG. 2, a parallel data bus 10 from an information source supplies data in parallel bytes, each byte containing eight bits of binary information. The data bus 10 is comprised of eight parallel lines which drive eight separate OR circuits shown for simplicity as one block 12. Each of the OR circuits 12 has three inputs. The outputs 14 of the OR circuits 12 drive a write register 16 which is comprised of eight bistable storage devices, each of which is turned on by the output of one of the OR circuits 12. The output of the write register 16 drives write amplifiers 18 which record data on magnetic recording tape via recording heads 20.

A vertical redundancy bit is written on the tape by combining the outputs of the write register 16 in a write parity generator 22 which drives a write amplifier 19.

Figure 1:
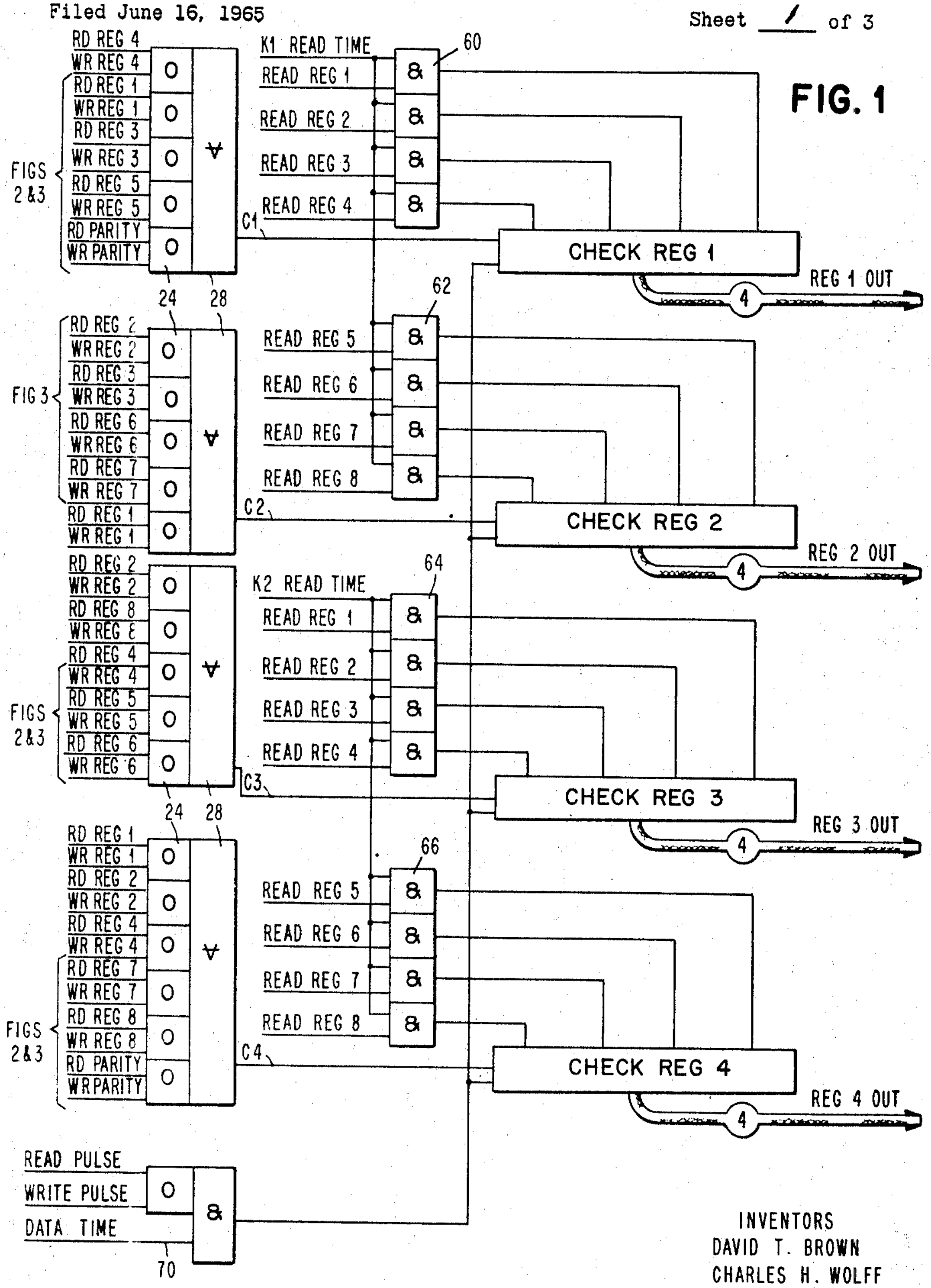
FIG. 1 is a block schematic diagram of one embodiment of an encoder/decorded constructed in accordance with the present invention.
Figures 3, 4:
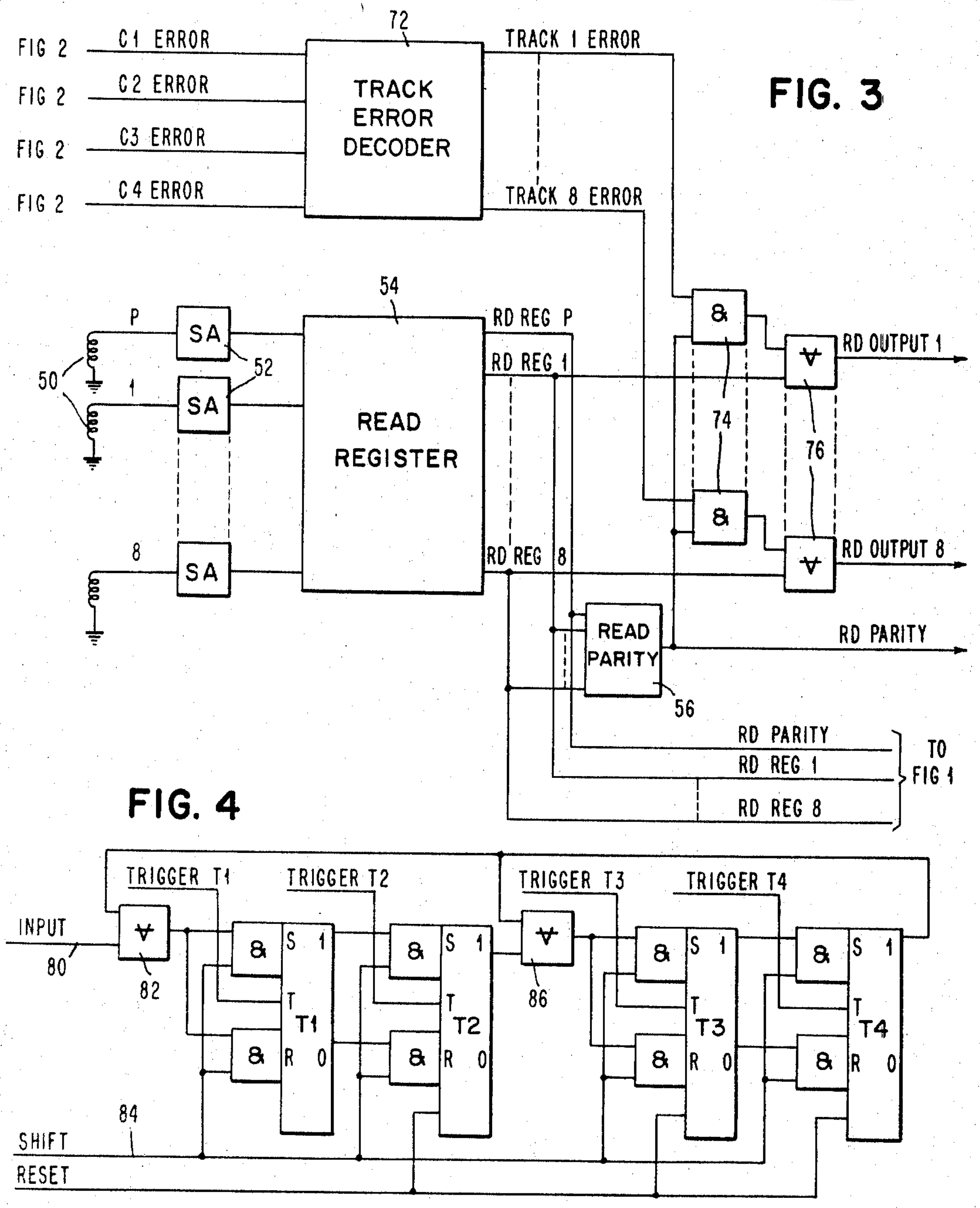
FIG. 3 is a block schematic diagram of the error-correction portion and the read portion of the illustrative embodiment of the invention.
FIG. 4 is a more detailed block schematic diagram of the check registers shown in FIG. 1.

Referring now to FIG. 1, the outputs of write register 16 are combined in OR circuits 24 with outputs from the read register 54 shown in FIG. 3. The outputs of the ORs 24 drive Exclusive OR circuits 28 which combine the write register outputs in accordance with a single-error-detecting/multiple - error - correcting permutation code (for example, of the type described in Hamming et al. Reissue Patent 23,601, "Error Detecting and Correcting System," Dec. 23, 1952). The outputs C1, C2, C3, C4 of Exclusive OR's 28 representing the permutation code bits drive linear feedback shift registers 1, 2, 3, 4. The feedback shift registers are of the type described by W. W. Peterson in "Error Correcting Codes," published by Wiley and MIT Press, 1961.

*Detailed description of a write operation*

Data to be written and stored on magnetic tape are received from an information source over the data bus 10 shown in FIG. 2. The data bus is comprised of eight separate lines, one for each bit in a parallel eight-bit character. The data bus drives OR circuits 12, the eight outputs of which are represented by bus 14. Outputs of the OR circuits 12 set bistable devices in write register 16 in accordance with the character present on data bus 10. The outputs WR. Reg. 1–WR. Reg. 8 of write register 16 drive write amplifiers 18 and in combination with a write pulse received on line 21 cause the current in the magnetic recording heads 20 to be reversed to thereby write information on the magnetic tape.

A parity bit taken over the character is written in a ninth track next to the character by the write parity generator 22 which receives inputs from the write register 16 and produces an odd or even write parity via write amplifier 19.

The outputs of the write register and the write parity generator 22 are fed to the error-detecting/correcting code generator shown in FIG. 1. Write register outputs 1, 3, 4, and 5 and the write parity are fed to OR circuits, the outputs of which are summed modulo 2 in an Exclusive OR to produce a check bit C1 which represents the parity of the associated data positions. In a similar manner, data positions 1, 2, 3, 6 and 7 are summed to produce a check bit C2; tracks 2, 4, 5, 6, and 8 are summed to produce check bit C3; and data positions 1, 2, 4, 7, 8 and write parity are summed to produce check bit C4.

As subsequent data characters are received from the information source and are written on the magnetic tape, the outputs of the Exclusive OR's 28 produce a stream of check bits C1, C2, C3, and C4 concurrently with the writing of characters on magnetic tape. The outputs of the Exclusive OR's 28 are fed to linear feedback shift registers 1, 2, 3, and 4 and there the streams of check bits are encoded according to a cyclic redundancy code.

Figure 5:
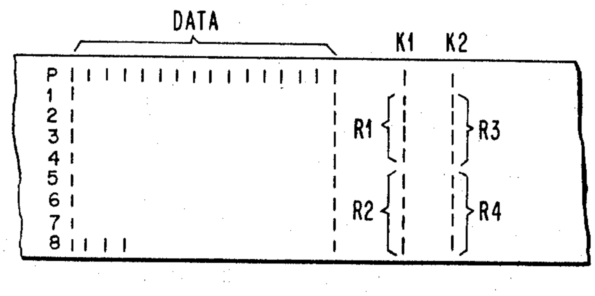
FIG. 5 illustrate the format of data recorded on a magnetic tape showing the location of check characters written in accordance with the present invention.

As shown in FIG. 5, the check characters K1 and K2 are written following the data block. Character K1 is comprised of the contents of check registers 1 and 2; and character K2 is comprised of the contents of check registers R3 and R4, along with a parity taken over the entire check character K1 or K2. The outputs of register 1 are fed to AND circuits 30 (FIG. 2). The outputs of register 2 are fed to AND circuits 32. These AND's are gated at write K1 time in the character cycle via a bus 34 to one leg of the eight OR circuits 12 and from thence to the write register 16.

In a similar manner, the outputs of registers R3 and R4 are ANDed together in AND circuits 34, 36, where they are gated at write K2 time via another leg of the eight OR circuits 12 to the write register 16. The eight OR circuits 12 therefore provide for the writing of either data over data bus 10 or check characters K1 and K2 via busses 34 or 38.

The parity bits for the check characters K1 and K2 are generated the same as for any other data character by the write parity generator 22, which operates to take a parity over all of the write register 16 positions.

*Detailed description of a read operation, including error detection*

The read circuits are shown in FIG. 3. The read coils 50 on the read head drive sense amplifiers 52 which store digital data in a read register 54, comprised of nine bistable devices, one for each parallel track on the tape. A read parity error is detected by read parity circuit 56 which combines the eight data tracks with the parity bit track recorded on tape and tests for odd or even parity, depending upon which parity was used during the write operation.

The outputs of the read register 54 are ORed in OR circuits 24 (FIG. 1) and then combined in Exclusive OR circuits 28 to reproduce the check bits C1, C2, C3, and C4 for the data block. The check bits are now fed to check registers 1, 2, 3, and 4. At the end of a read pass of the entire data block, the check registers should contain the same pattern of check bits as was recorded in check characters K1 and K2 on the magnetic tape. At K1 read time, the outputs of the read register are gated via AND circuit groups 60, 62, to complement check register positions in check registers 1 and 2.

At K2 read time, the outputs of the read register are gated via AND circuit groups 64, 66, to complement check register positions in check registers 3, 4, in accordance with the pattern stored in the read register. If the data block has been received without error, the check registers should all contain zero after the check characters have been read from the tape and utilized to complement the check register positions. It should be noted at this point that the check registers are not shifted during the reading of the K1 and K2 check characters. This is accomplished by the data time line 70 which is negative during the time that the check characters are read.

In accordance with Hamming Code theory, if the data block contains an error during the read operation, one or more of the Hamming check bits C1, C2, C3, C4 will fail. Further, in accordance with the cyclic error-correcting theory set forth in Peterson's book, cited above, the check pattern stored in the check register for the failed check bit will not be the same as the check patterns written on the tape in the form of check characters K1, K2. That is, one of the check registers 1–4 will contain a non-zero after the check characters have been read. Thus, the check register or registers which contain a non-zero will identify which ones of the Hamming check bits C1–C4 failed. This information identifies the erroneous track when the check bits are decoded in a track error decoder 72 (FIG. 3). The track error decoder decodes combinations of Hamming check bits C1–C4 in accordance with the well-known Hamming Code theory to identify the particular track which contains the error. One of the track error outputs of the track error decoder 72 will thus be energized. The output of the track error decoder is combined with the read parity check from the read parity circuit 56 in one of the AND circuits 74. The output of one of the AND circuits 74 will then invert the contents of the read register 54 via Exclusive OR 76 to thereby invert the erroneous bit and provide a corrected read output at the output of the Exclusive OR circuits 76.

*Detailed description of the check registers*

The check registers 1–4 (FIG. 1) are identical in the embodiment of the invention shown but need not be. The structure of a typical check register is shown in FIG. 4. A serial input 80 drives an Exclusive OR 82, the output of which drives AND circuits on the set and reset inputs of trigger T1. A shift line 84 is provided which causes the data stored in one of the triggers, for example T1, to be transferred to the next trigger T2 whenever the shift line is energized. The output of the triggers each feeds the next succeeding trigger, either directly or via an Exclusive OR. The feedback connection from trigger T4 feeds an Exclusive OR 86 to add (modulo 2) the contents of trigger T4 to the contents of trigger T2. The result of this addition is placed in trigger T3. The output of trigger T4 is also fed back to the Exclusive OR 82. The wiring of this feedback shift register provides a generator polynominal of the form $1+X^2+X^4$. The theory of this type of a register will not be fully developed herein, because reference may be made to Peterson's book mentioned above for details.

In addition to the set and reset inputs to the triggers T1–T4, a "T," or trigger input, is provided which is a binary connection which changes the state of a trigger to its opposite state whenever the trigger input T is energized. The complementing operation of the check registers during K1 or K2 read time is accomplished by pulsing the trigger inputs in accordance with the character read from the tape. For example, referring again to FIG. 1, if at K1 read time the read register positions 1–4 correspond to the pattern 1101 and if, for example, there was an error in the Hamming check bit C1, the check register 1 would contain some pattern other than the pattern recorded on tape and stored in the read register. For example, the check register 1 pattern read may be 1100. In this event, at K1 read time, the outputs of the read register 1–4 are sampled via AND circuits 60 (FIG. 1), causing output pulses from the first, second, and fourth AND circuits. These output pulses cause the corresponding triggers T4, T2, and T1 to be complemented. Trigger T4 being in the zero state (the error condition) rather than the one state (the non-error condition) ends up being complemented from zero to one, whereas triggers T3 and T1 are complemented from "1" to "0". Thus, the contents of check register 1 would be 0001 instead of an all-zero condition, indicating a failure of check bit C1.

The output lines of check register 1 feed a four-input OR circuit (FIG. 2), the output of which drives an AND circuit. An error sample occurring on error sample line samples the four AND circuits corresponding to C1 error-C4 error. Since a non-zero occurs in register 1, the output of C1 error is positive when the error sample occurs.

In the particular embodiment shown in FIGS. 1, 2, and 3, the failed check bits locate the erroneous track in accordance with the following table. The decoder 72 shown in FIG. 3 must therefore be constructed to generate track error signals in accordance with this table:

| Check Bit | Track in Error | | | | | | | | |
|---|---|---|---|---|---|---|---|---|---|
| | P | 1 | 2 | 3 | 4 | 5 | 6 | 7 | 8 |
| C1 | X | X | | X | X | X | | | |
| C2 | | X | X | X | | | X | X | |
| C3 | | | X | | X | X | X | | X |
| C4 | X | X | X | | X | | | X | X |

While the invention has been particularly shown and described with reference to a preferred embodiment thereof, it will be understood by those skilled in the art that various changes in form and details may be made therein without departing from the spirit and scope of the invention.

What is claimed is:

1. In a parallel plural track recording system, the combination comprising:

means for encoding data recorder in the parallel tracks into an *m*-bit permutation code constructed from code groups comprising the plurality of tracks in accordance with a multiple error-detecting/single error-correcting code, to thereby produce *m* parallel streams of serial data bits;

means responsive to said encoding means for applying said *m* streams separately to *m* means for encoding the bits in said streams modulo a coding polynomial in accordance with a serial cyclic redundancy error-detecting code;

means for decoding the data bits in said encoded streams modulo said coding polynomial to detect a bit failure in any one of said streams, and for producing check bit outputs indicative of such failure and means responsive to said check bit outputs for decoding said detected failed streams according to said error-correcting code to thereby identify the track causing the failure.

2. In a parallel plural track data storage device, the combination comprising:

means for encoding data stored in said parallel tracks into an *m* element permutation code constructed from code groups comprising the plurality of tracks, in accordance with a single error-correcting/multiple error-detecting code to thereby generate *m* parallel check-element series;

means responsive to said encoding means for applying each separate check-element series to *m* separate linear feedback shift registers having feedback connections constructed in accordance with a cyclic redundancy code for coding the check elements in each series modulo a coding polynominal;

and means for storing the contents of said linear feedback shift registers as check characters, along with the stored parallel data.

3. The combination according to claim 2, including a decoder comprising means for reading a block of data and said check characters from the storage device and for combining the data recorded in said parallel tracks in accordance with the *m* element permutation code to regenerate the code groups comprising the plurality of tracks;

means responsive to said decoder for applying each separate element of the regenerated code group to *m* separate linear feedback shift registers substantially identical to said aforementioned shift registers to thereby reconstruct the check characters, and means responsive to said reading means for inhibiting the further reading of data bits into said shift registers at the end of said data block and for comparing the check characters read from said storage device with the reconstructed check characters and for generating output pulses representing failed check bits whenever a non-comparison exists.

4. The combination according to claim 3 including means responsive to said output pulses corresponding to failed check bits for determining the track in error and for storing such determination, and means for rereading said data block, which includes means for identifying an erroneous character and means for inverting the bit in the track identified by said determining means to thereby supply a corrected output of said erroneous character.

5. In an *n* parallel track recording system, the combination comprising:

writing means for storing digital data blocks of characters written as parallel bits in the tracks, each character including a parity bit representing a parity taken over the bits in the character;

means for encoding data recorded in the *n* parallel tracks into an *m* element permutation code constructed from code groups comprising the plurality of tracks, in accordance with a single error-correcting/multiple error-detecting code to thereby generate *m* parallel check element series;

means responsive to said encoding means for applying each separate element of the constructed code group to *m* separate linear feedback shift registers having feedback connections constructed in accordance with a cyclic redundancy code for coding the bits in each modulo a coding polynomial;

means for storing the contents of said linear feedback shift registers as check characters along with the recorded parallel data;

reading means for reading a block of data from the recording system including a decoder for combining the data recorded in said parallel tracks in accordance with the *m* element permutation code to reconstruct the code groups comprising the plurality of tracks;

means responsive to said reading means for applying each separate element of the reconstructed code group to *m* separate linear feedback shift registers substantially identical to said aforementioned shift registers to reconstruct the check characters;

and failed check bit identification means for inhibiting the further reading of data bits into said shift registers at the end of a data block and for comparing the read check characters with the reconstructed check characters and for generating an output pulse whenever a noncomparison exists.

6. The combination according to claim 5 including means responsive to the combination of failed check bits as indicated by said check bit identification means for determining the track in error and for storing such determination and means for rereading said data block, which includes means for identifying an erroneous character and means for inverting the bit in the track identified by said track-in-error determining means to thereby supply a correct version of said erroneous character.

7. In a parallel track data storage means including a read register and a write register:

means for reading, operative during a reading cycle, for transferring data stored in said storage means to said read register;

means for writing, operative during a writing cycle, for transferring data to be stored in said storage means into said write register;

means for ORing like stages of said read and write registers together;

a plurality of summing means responsive to the outputs of selected ones of said ORing means for summing data in selected tracks grouped in accordance with an error-correcting code to thereby produce check bits at an output of each summing means;

a plurality of linear feedback shift registers equal in number to the number of summing means;

means for applying the output of each summing means to a separate linear feedback shift register to thereby generate cyclic code check characters for each of said outputs;

and gating means, operative during said write cycle, for gating the contents of said linear feedback shift registers to said write register to thereby write check characters generated by said shift registers into said storage means.

8. The combinatioin according to claim 7 wherein said reading means includes means for gating the contents of said read register to said linear feedback shift registers during a time in the reading cycle when a check character corresponding to the check character generated during the write cycle by said shift register is stored in said read register to thereby complement respective stages of said shift register in such a manner that if the check character stored in said read register is unequal to the check character regenerated during the reading process, the shift register will contain an error pattern;

means for sampling the status of said linear feedback shift registers after all check characters have been read and for generating outputs corresponding to the failed check bits identifiable by the status of said shift registers;

and a track-error-decoder for decoding the failed check bit outputs of said sampling means to thereby identify the track in error.

References Cited

UNITED STATES PATENTS

| | | | |
|---|---|---|---|
| 2,977,047 | 3/1961 | Bloch | 235—153 |
| 3,183,483 | 5/1965 | Lisowski | 340—146.1 |

OTHER REFERENCES

C. H. Wolff, Parallel I/O Error Detection and Correction, IBM Technical Disclosure Bulletin, vol. 7, No. 10, March 1965.

K. Y. Sih, Single Track Error Correction on Multichannel Tapes, IBM Technical Disclosure Bulletin, vol. 8, No. 3, August 1965.

MALCOLM A. MORRISON, *Primary Examiner.*

C. E. ATKINSON, *Assistant Examiner.*

U.S. Cl. X.R.

235—153; 340—174.1

U.S. DEPARTMENT OF COMMERCE
PATENT OFFICE
Washington, D.C. 20231

UNITED STATES PATENT OFFICE
CERTIFICATE OF CORRECTION

Patent No. 3,439,331 April 15, 1969

David Trent Brown et al.

It is certified that error appears in the above identified patent and that said Letters Patent are hereby corrected as shown below:

Column 2, line 35, "decorded" should read -- decoder --. Column 6, line 62, after "each" insert -- series --.

Signed and sealed this 7th day of April 1970.

(SEAL)
Attest:

Edward M. Fletcher, Jr.
Attesting Officer

WILLIAM E. SCHUYLER, JR
Commissioner of Patents